(12) United States Patent
Merker

(10) Patent No.: US 12,153,511 B2
(45) Date of Patent: Nov. 26, 2024

(54) ENABLING OF DEVELOPMENT CHECKS

(71) Applicant: SAP SE, Walldorf (DE)

(72) Inventor: Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 31 days.

(21) Appl. No.: 17/746,586

(22) Filed: May 17, 2022

(65) Prior Publication Data

US 2023/0376405 A1    Nov. 23, 2023

(51) Int. Cl.
*G06F 11/36* (2006.01)
*G06F 8/41* (2018.01)

(52) U.S. Cl.
CPC ............ *G06F 11/3688* (2013.01); *G06F 8/41* (2013.01)

(58) Field of Classification Search
None
See application file for complete search history.

(56) References Cited

U.S. PATENT DOCUMENTS

| 2006/0041544 A1* | 2/2006 | Santosuosso | G06F 16/245 |
| 2008/0319959 A1* | 12/2008 | Bireley | G06F 11/3604 |
| 2020/0125561 A1* | 4/2020 | Meyer | G06F 8/4443 |

OTHER PUBLICATIONS

Paul, "Improving Execution Efficiency of Just-in-time Compilation based Query Processing on GPUs", 2020, ACM (Year: 2020).*

* cited by examiner

*Primary Examiner* — Hossain M Morshed
(74) *Attorney, Agent, or Firm* — Mintz Levin Cohn Ferris Glovsky and Popeo, P.C.

(57) ABSTRACT

A method, a system, and a computer program product for providing one or more checks during execution of queries an application. A query is received for execution by a software application. A just-in-time executable code is generated for execution of the received query. A determination is made that the generated just-in-time executable code is configured to include one or more testing codes for testing the software application. The testing codes are associated with one or more conditions. The generated just-in-time executable code and one or more testing codes are executed. The testing codes are executed upon a determination that one or more conditions are activated.

20 Claims, 5 Drawing Sheets

ENABLING OF DEVELOPMENT CHECKS

TECHNICAL FIELD

This disclosure relates generally to data processing and, in particular, to enabling of development checks to determine presence of errors in software applications' releases.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some implementations, the current subject matter relates to a computer implemented method for providing one or more checks during execution of queries an application. The method may include receiving a query for execution by a software application, generating a just-in-time executable code for execution of the received query, determining that the generated just-in-time executable code may be configured to include one or more testing codes for testing the software application, where the testing codes may be associated with one or more conditions, and executing the generated just-in-time executable code and one or more testing codes, where one or more testing codes are executed upon a determination that one or more conditions are activated.

In some implementations, the current subject matter may include one or more of the following optional features. One or more testing codes may be included in the generated just-in-time executable code based on at least one previous generation and compilation of another just-in-time executable code for execution of another received query by the software application. One or more conditions may include at least one of the following: a logical condition, a Boolean expression condition, a condition determining whether to activate one or more testing codes, and any combination thereof. One or more conditions may be activated during at least one previous generation and compilation of another just-in-time executable code for execution of another received query by the software application. One or more conditions may be activated based on at least one of the following: a fault, an error, an exception, and any combination thereof during the at least one previous generation and compilation of another just-in-time executable code for execution of another received query by the software application.

In some implementations, the generating may include compiling the just-in-time executable code for execution of the received query. The determining may include determining that the generated just-in-time executable code includes one or more testing codes based on the compiling of the just-in-time executable code.

In some implementations, the executing may include executing the generated just-in-time executable code and the one or more testing codes. One or more testing codes may be selectively activated for the executing.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
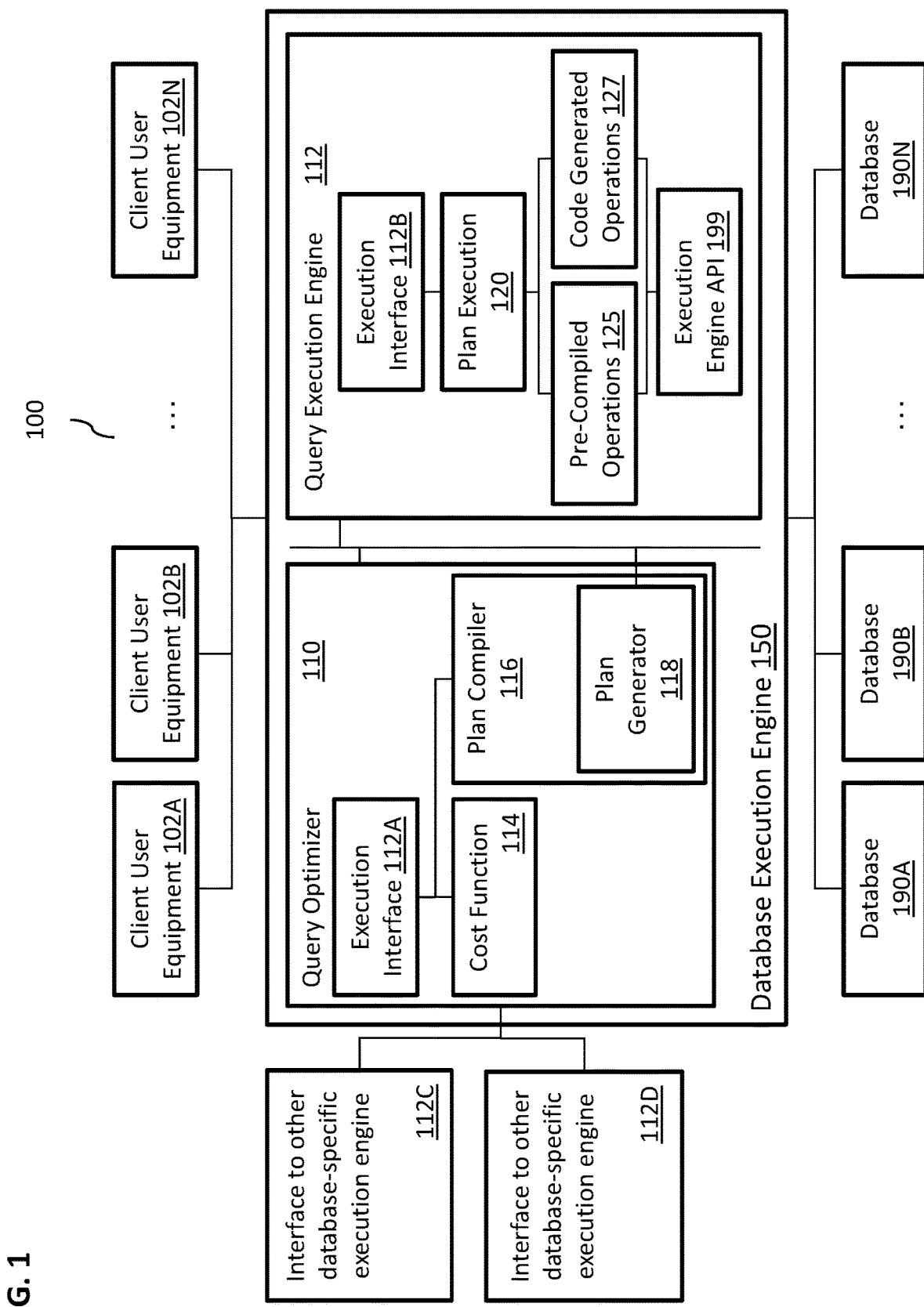
FIG. 1 illustrates an exemplary system, according to some implementations of the current subject matter.

To address these and potentially other deficiencies of currently available solutions, one or more implementations of the current subject matter relate to methods, systems, articles of manufacture, and the like that can, among other possible advantages, provide enabling of development checks to determine presence of errors in released software applications (e.g., during execution of queries by such software applications).

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 illustrates an exemplary system 100, according to some implementations of the current subject matter. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

During development of code for software applications, developers often make various assumptions about a certain state of the software application that the code relies on to work properly. Typically, such assumptions may be made through use of various statements, such as, an ASSERT statement. The ASSERT statement may define a conditioned checkpoint (e.g., an assertion) in the code. For example, a logical expression may be specified as part of the statement. Thus, when the software application, during execution, reaches such an active assertion, the logical expression may be evaluated and the software application's execution may continue with one or more of next statements after the ASSERT statement only if the result of the evaluation of the logical expression returns a true value. Otherwise, execution cannot continue and an error may be generated and/or an exception may be thrown. However, if the assertion is inactive, the logical expression contained in the assertion is not evaluated and the execution of the software application continues with the next statement after ASSERT statement.

Further, assertions statements may be used for verifying a correct state of the software application's execution by explicitly declaring one or more assumptions about its execution. As such, assertion statement may provide various insights into expected behavior of the software application by making such assumptions explicit, which, in turn, makes it easier to maintain software applications. Some assertion statements may always be active (e.g., through use of logical expression, as discussed above), i.e., included in the executable code. Other assertion statements might not be included in the executable code, and thus, may be inactive by default.

Assertion statements allows making various implicit assumptions and/or requirements at the time of development of the software application to be explicitly available in the software application. For example, at the beginning of a method in the software application, an assertion statement may be specified that, when encountered, may check whether the input for that method is correct. If the input is incorrect, an error may be generated and/or exception may be thrown, which may halt further execution of the method. Moreover, at the end of the method, an additional assertion statement may be inserted to check whether the output the method is as expected and/or meets certain conditions, etc.

In some scenarios, use of assertion statements may be helpful during development to check various assumptions/requirements associated with execution of the software application, and if conditions associated with those assumptions/requirements do not hold true (e.g., during evaluation of the logical expression), the software application may be forced to crash. This may be preferable as it may more difficult and more time-consuming to determine which and/or why a particular portion of the software application has failed in some undefined way.

In other scenarios, rather than crashing the software application, a "softer" response of throwing an exception (e.g., disrupting a normal flow of execution of the software application). Such exception throw may be cause, for example, an aborting of a current query that may be issued to and/or by the software application. This may be advantageous because even if the condition of the assertion statement is violated (e.g., indicating presence of an error, a bug, etc.), any impact of such error, bug, etc. may be minimized, which may be more desirable in an end-user computing system.

However, in some situations, when a condition of an assertion statement is met and despite that, execution of the software application, evaluation of the condition may negatively impact performance of the software application, especially, in a high-performance-critical code-paths of the software application. In some implementations, the current subject matter may be configured to incorporate use of one or more checks that may be implemented during a development of the software application and used to check for errors, faults, bugs, etc. For example, such checks may be implemented in non-release builds of software applications prior to such applications becoming end-user systems. The checks may be deactivated at compile-time of the software application (e.g., producing no executable code) so that performance of the software application during execution is not affected. The checks, when encountered, may be used to identify a location of the error, fault, bug, etc. and/or specify its cause.

Figure 2:
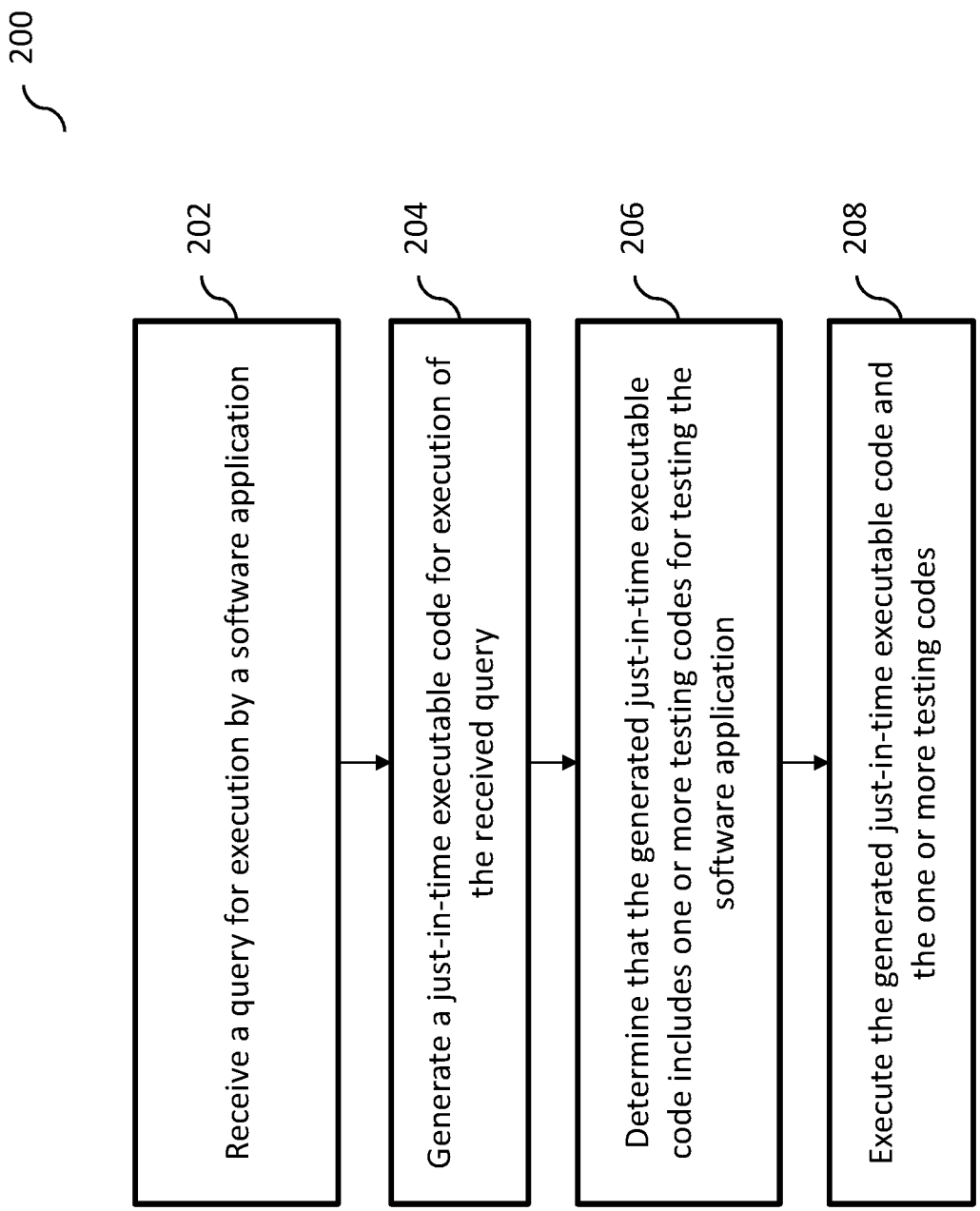
FIG. 2 illustrates an exemplary method for providing one or more checks during development of an application, according to some implementations of the current subject matter.

FIG. 2 illustrates an exemplary method 200 for providing one or more checks during execution of queries an application, according to some implementations of the current subject matter. The method 200 may be executed by one or more components of the system 100 shown in FIG. 1 and/or one or more components of the systems 300 and/or 400 shown in FIGS. 3 and 4, respectively, and discussed below. At 202, a query may be received for execution by the software application. For execution of the query, one or more just-in-time executable codes may be generated, at 204. The executable code may include one or more testing codes that may be provided in one or more locations in such executable code of the software application for execution. Each testing code may be associated with one or more conditions. As discussed above, testing codes may correspond to one or more assertion and/or "softer" assertion statements that when encountered may cause an exception to be thrown rather than a crash of the software application. Alternatively, or in addition, the statements may be used to halt execution of the software application.

The decision to include testing codes in the just-in-time generated code may be made as a result of previous executions of one or more queries (e.g., another query received by the software application). Alternatively, or in addition to, the testing codes may be used in the end-user system (e.g., a release-build system), where the testing codes may be selectively activated, e.g., by the end user and/or upon certain conditions being met. The testing codes may be used to determine errors, faults, etc. in the code of the software application so that these may be investigated and resolved for the following query executions by the software application.

In some implementations, the testing codes may be activated upon being encountered during execution of the query by the software application. As stated above, each testing code may be associated with one or more particular conditions that may need to be met to determine whether to continue execution of the query by the software application using the generated code and/or whether an error, fault, etc. have been encountered and the software application's code (and/or any portion thereof) has not performed as expected.

At 206, the current subject matter may be configured to determine that the generated just-in-time executable code includes one or more testing codes for testing the software application. In some implementations, the current subject matter may be configured to perform an assessment of one or more conditions that may be associated with each testing code to determine whether to activate the code(s). The assessment may involve evaluation of any logical conditions and/or other parameters associated with such conditions to determine performance of the executable code. After assessing each condition of the testing code, the current subject matter may be configured to determine whether to continue execution of the just-in-time code generated by the software application.

If the conditions are met, a determination may be made that there are no errors, faults, bugs, etc. in the generated code and the execution of the code generated for the query may continue. Otherwise, any errors, faults, bugs, etc. may need to be investigated and/or resolved.

At 208, the current subject matter may be configured to execute the generated just-in-time executable code and one or more testing codes. Execution of the testing codes may include a determination that the one or more conditions associated with one or more testing codes are activated. For example, the testing codes may be activated once it has been determined that there are errors, faults, bugs, etc. associated with one or more previous executions of queries by the software application.

In some implementations, one or more testing codes may be included in the generated just-in-time executable code based on at least one previous generation and compilation of another just-in-time executable code for execution of another received query by the software application. For example, during one or more previous executions of queries (e.g., same or different queries) by the software application, it may have been determined that there was an error, a fault, etc. and thus, a testing code may need to be included in one or more future executions of queries by the software application. The testing codes may be selectively included and/or activated.

In some implementations, inclusion of testing codes may be based on determination that one or more conditions associated with such codes may have been met. Alternatively, or in addition, a developer of the software application may activate the testing codes at development and provide a configuration switching mechanism allowing their activation in a released version. The conditions may include at least one of the following: a logical condition, a Boolean expression condition, a condition determining whether to activate one or more testing codes, and any combination thereof. Further, the conditions may be activated during at least one previous generation and/or compilation of another just-in-time executable code for execution of another received query by the software application. Additionally, the conditions may be activated based on at least one of the following: a fault, an error, an exception, and any combination thereof during at least one previous generation and/or compilation of another just-in-time executable code for execution of another received query by the software application.

In some implementations, generation of the just-in-time executable code may include compiling such just-in-time executable code for execution of the received query. Compilation may include a determination that inclusion of one or more testing codes may be necessary and/or desired to ensure that any subsequent query executions by the software application can be tested.

In some implementations, execution of the generated just-in-time executable code and one or more testing codes may be made based on selective activation of one or more testing codes for the purposes of execution of the just-in-time code. This may provide a possibility that such testing codes may be de-activated and/or activated as desired.

As stated above, each testing code may be associated with one or more conditions. Some non-limiting examples of such conditions may include at least one of the following: a logical condition, a Boolean expression condition, a condition determining whether to activate one or more testing codes, and any combination thereof. An assessment and/or an evaluation of the logical condition may result in a determination that there is a failure in the executable code generated/compiled for the query by the software application. Alternatively, or in addition to, it may be determined that the failure is not fatal to the execution of the query's generated/compiled executable code by the software application.

Thus, the determination resulting from assessment of the condition(s) associated with each testing code may result in a generation of a determination to execute the query's generated/compiled executable code by the software application upon determining that one or more conditions of the testing codes are satisfied. Otherwise, if one or more conditions are not satisfied, the current subject matter may generate a determination not to execute the query's generated/compiled executable code by the software application. The current subject matter may be configured to generate at least one of: a fault, an error, an exception, and any combination thereof.

In some implementations, the current subject matter may be configured to selectively de/activate, based on the assessment of the conditions associated with the testing codes and subsequent determinations, one or more testing codes for execution of the query's generated/compiled executable code by the software application during the runtime execution state(s). Further, as part of such selective de/activation, one or more testing codes for execution of the software application during the runtime execution state(s) may remain active. This may be helpful in trying to analyze any issues that may occur only during runtime of the query's generated/compiled executable code by the software application and/or during any other times.

In some implementations, selective activation of the testing codes may be configured to use just-in-time generated software code, whereby software code for execution of various query (e.g., SQL queries) may be generated and compiled on-the-fly. Thus, while the testing code may be by default inactive in released versions of the software application, activation of such testing codes may leverage just-in-time code generation feature associated with such queries to allow checking of the release version of the software application (e.g., during query generation, compilation, etc.). Since the code of the query is compiled just-in-time, no negative impact on the performance of the software application may be incurred when the checks are disabled. This may allow for an optimal performance of the software application while allowing for checking of the software application when a need arises.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 3:
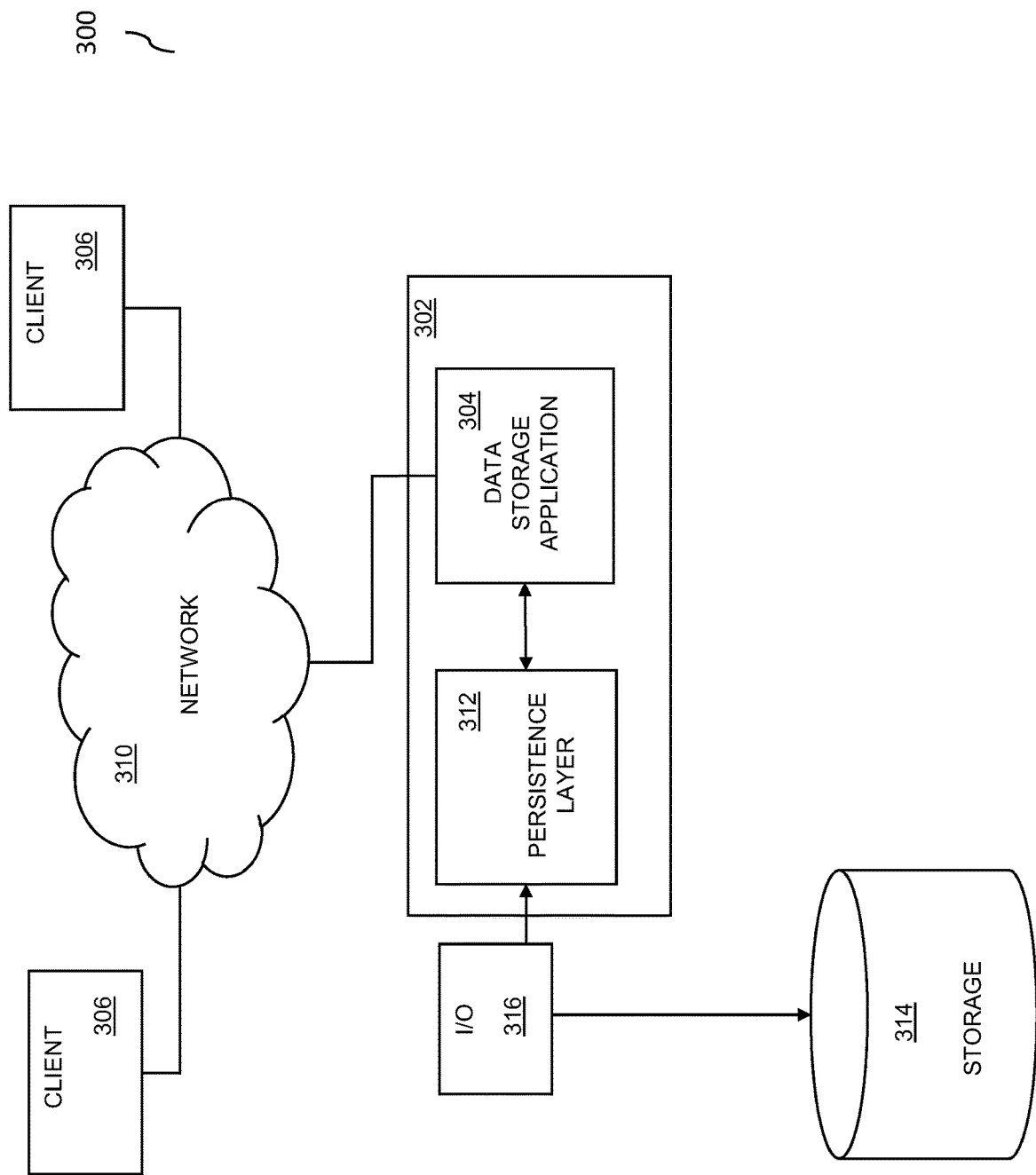
FIG. 3 is a diagram illustrating an exemplary system including a data storage application, according to some implementations of the current subject matter.

FIG. 3 illustrates an exemplary system 300 in which a computing system 302, which may include one or more programmable processors that may be collocated, linked over one or more networks, etc., executes one or more modules, software components, or the like of a data storage application 304, according to some implementations of the current subject matter. The data storage application 304 may include one or more of a database, an enterprise resource program, a distributed storage system (e.g. NetApp Filer available from NetApp of Sunnyvale, CA), or the like.

The one or more modules, software components, or the like may be accessible to local users of the computing system 302 as well as to remote users accessing the computing system 302 from one or more client machines 306 over a network connection 310. One or more user interface screens produced by the one or more first modules may be displayed to a user, either via a local display or via a display associated with one of the client machines 306. Data units of the data storage application 304 may be transiently stored in a persistence layer 312 (e.g., a page buffer or other type of temporary persistency layer), which may write the data, in the form of storage pages, to one or more storages 314, for example via an input/output component 316. The one or more storages 314 may include one or more physical storage media or devices (e.g. hard disk drives, persistent flash memory, random access memory, optical media, magnetic media, and the like) configured for writing data for longer term storage. It should be noted that the storage 314 and the input/output component 316 may be included in the computing system 302 despite their being shown as external to the computing system 302 in FIG. 3.

Data retained at the longer term storage 314 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 4:
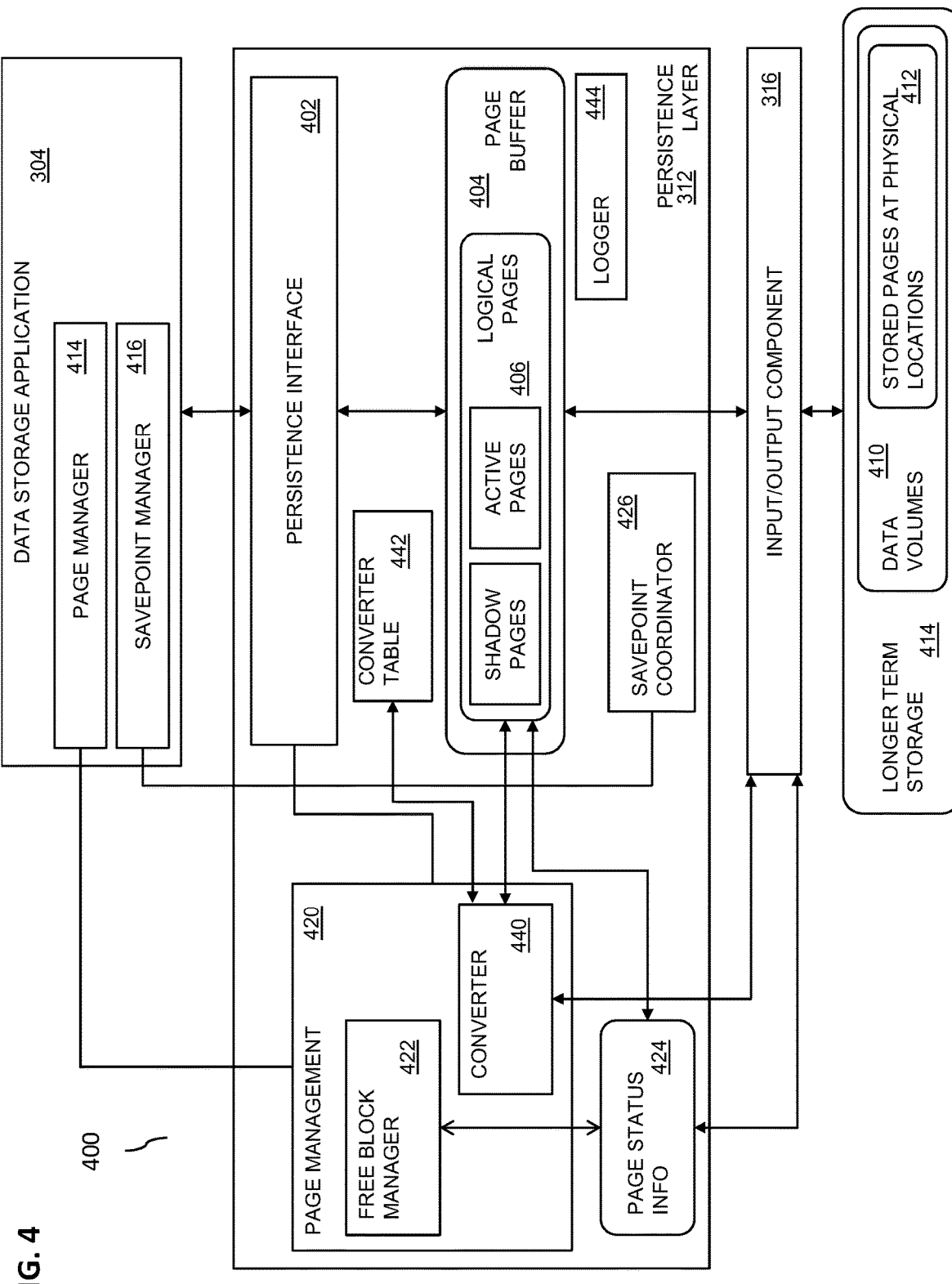
FIG. 4 is a diagram illustrating details of the system of FIG. 3.

FIG. 4 illustrates exemplary software architecture 400, according to some implementations of the current subject matter. A data storage application 304, which may be implemented in one or more of hardware and software, may include one or more of a database application, a network-attached storage system, or the like. According to at least some implementations of the current subject matter, such a data storage application 304 may include or otherwise interface with a persistence layer 312 or other type of memory buffer, for example via a persistence interface 402. A page buffer 404 within the persistence layer 312 may store one or more logical pages 406, and optionally may include shadow pages, active pages, and the like. The logical pages 406 retained in the persistence layer 312 may be written to a storage (e.g. a longer term storage, etc.) 314 via an input/output component 316, which may be a software module, a sub-system implemented in one or more of software and hardware, or the like. The storage 314 may include one or more data volumes 410 where stored pages 412 are allocated at physical memory blocks.

In some implementations, the data storage application 304 may include or be otherwise in communication with a page manager 414 and/or a savepoint manager 416. The page manager 414 may communicate with a page management module 420 at the persistence layer 312 that may include a free block manager 422 that monitors page status information 424, for example the status of physical pages within the storage 314 and logical pages in the persistence layer 312 (and optionally in the page buffer 404). The savepoint manager 416 may communicate with a savepoint coordinator 426 at the persistence layer 312 to handle savepoints, which are used to create a consistent persistent state of the database for restart after a possible crash.

In some implementations of a data storage application 304, the page management module of the persistence layer 312 may implement a shadow paging. The free block manager 422 within the page management module 420 may maintain the status of physical pages. The page buffer 404 may include a fixed page status buffer that operates as discussed herein. A converter component 440, which may be part of or in communication with the page management module 420, may be responsible for mapping between logical and physical pages written to the storage 314. The converter 440 may maintain the current mapping of logical pages to the corresponding physical pages in a converter table 442. The converter 440 may maintain a current mapping of logical pages 406 to the corresponding physical pages in one or more converter tables 442. When a logical page 406 is read from storage 314, the storage page to be loaded may be looked up from the one or more converter tables 442 using the converter 440. When a logical page is written to storage 314 the first time after a savepoint, a new free physical page is assigned to the logical page. The free block manager 422 marks the new physical page as "used" and the new mapping is stored in the one or more converter tables 442.

The persistence layer 312 may ensure that changes made in the data storage application 304 are durable and that the data storage application 304 may be restored to a most recent committed state after a restart. Writing data to the storage 314 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 444 may also be included to store the changes made to the data of the data storage application in a linear log. The logger component 444 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 444 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 312 may use a combination of undo log entries (from one or more logs) and shadow paging.

The persistence interface 402 may handle read and write requests of stores (e.g., in-memory stores, etc.). The persistence interface 402 may also provide write methods for writing data both with logging and without logging. If the logged write operations are used, the persistence interface 402 invokes the logger 444. In addition, the logger 444 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 444. For an entry of type "update", for example, this would be the identification of the affected record and the after image of the modified data.

When the data application 304 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 444 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 444 may write a database log (or simply referred to herein as a "log") sequentially into a memory buffer in natural order (e.g., sequential order, etc.). If several physical hard disks/storage devices are used to store log data, several log partitions may be defined. Thereafter, the logger 444 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 304 may use shadow paging so that the savepoint manager 416 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 5:
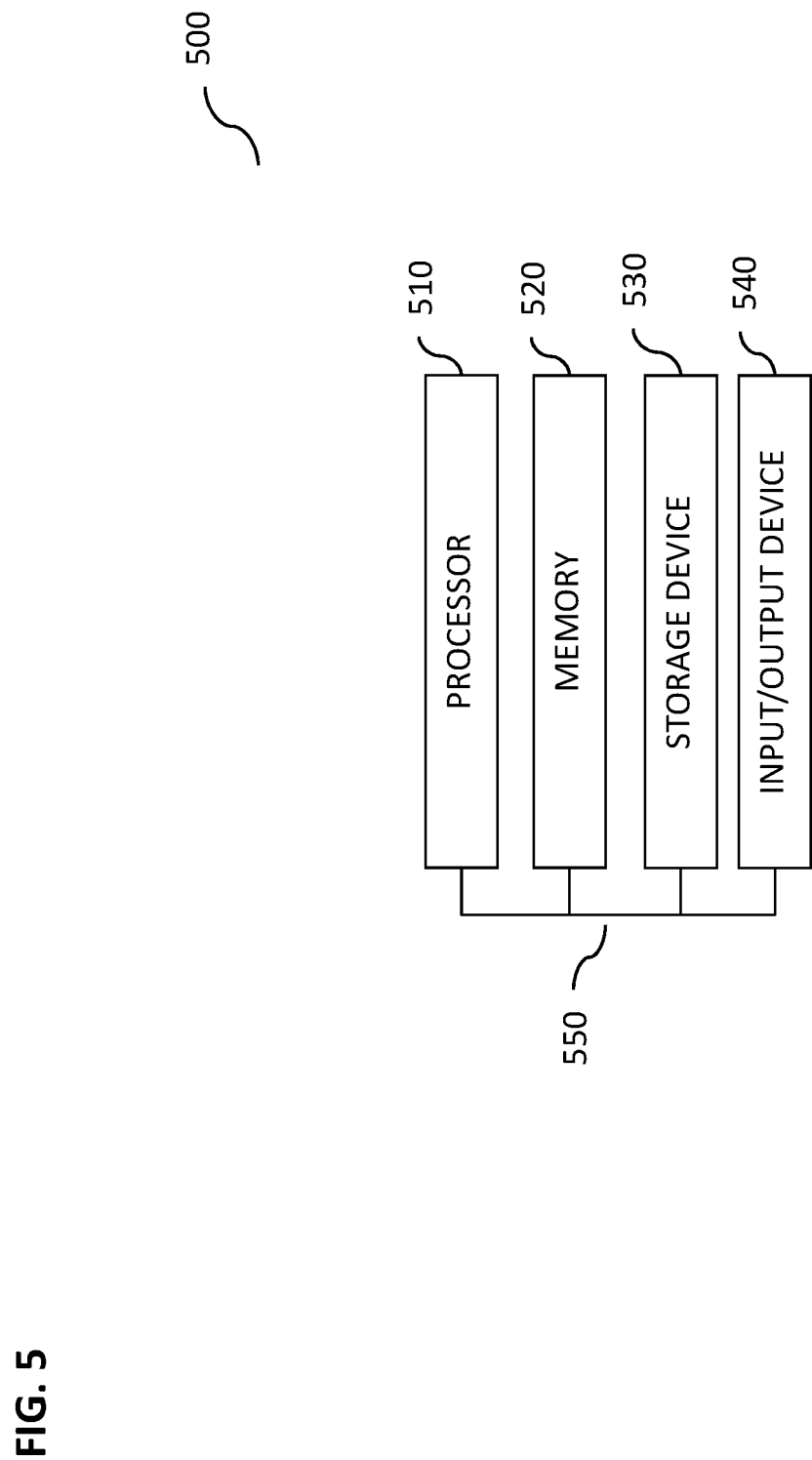
FIG. 5 is an exemplary system, according to some implementations of the current subject matter.

In some implementations, the current subject matter may be configured to be implemented in a system 500, as shown in FIG. 5. The system 500 may include a processor 510, a memory 520, a storage device 530, and an input/output device 540. Each of the components 510, 520, 530 and 540 may be interconnected using a system bus 550. The processor 510 may be configured to process instructions for execution within the system 500. In some implementations, the processor 510 may be a single-threaded processor. In alternate implementations, the processor 510 may be a multi-threaded processor. The processor 510 may be further configured to process instructions stored in the memory 520 or on the storage device 530, including receiving or sending information through the input/output device 540. The memory 520 may store information within the system 500. In some implementations, the memory 520 may be a computer-readable medium. In alternate implementations, the memory 520 may be a volatile memory unit. In yet some implementations, the memory 520 may be a non-volatile memory unit. The storage device 530 may be capable of providing mass storage for the system 500. In some implementations, the storage device 530 may be a computer-readable medium. In alternate implementations, the storage device 530 may be a floppy disk device, a hard disk device, an optical disk device, a tape device, non-volatile solid state memory, or any other type of storage device. The input/output device 540 may be configured to provide input/output operations for the system 500. In some implementations, the input/output device 540 may include a keyboard and/or pointing device. In alternate implementations, the input/output device 540 may include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving, using at least one processor, a query for execution by a software application;
generating, using the at least one processor, a just-in-time executable code for execution of the received query;
determining, using the at least one processor, to include one or more testing codes in the generated just-in-time executable code as a result of a previous execution of a previously received query by the software application, the one or more testing codes being associated with one or more conditions, and the one or more testing codes used for testing the software application;
performing, using the at least one processor, an assessment of the one or more conditions that are associated with the one or more testing codes to determine whether to activate the one or more testing codes;
activating, using the at least one processor, the one or more testing codes upon a determination that there are one or more errors associated with the previous execution of the previously received query by the software application; and
executing, using the at least one processor, the generated just-in-time executable code and the one or more testing codes, wherein the one or more testing codes are executed upon a determination that the one or more testing codes are activated.

2. The method according to claim 1, further comprising providing a configuration switching mechanism to allow activation of the one or more testing codes in a released version of the software application.

3. The method according to claim 2, wherein the one or more conditions include at least one of a logical condition, a Boolean expression condition, a condition determining whether to activate one or more testing codes, and any combination thereof.

4. The method according to claim 3, wherein the one or more conditions are assessed during at least one previous execution of another received query by the software application.

5. The method according to claim 4, wherein the one or more testing codes are activated based on an exception during the at least one previous execution of another received query by the software application.

6. The method according to claim 1, wherein the generating includes compiling the just-in-time executable code for execution of the received query.

7. The method according to claim 6, wherein the determining includes determining that the generated just-in-time executable code includes one or more testing codes based on the compiling of the just-in-time executable code.

8. The method according to claim 1, wherein the executing includes executing the generated just-in-time executable code and the one or more testing codes, wherein the one or more testing codes are selectively activated for the executing.

9. A system comprising:
at least one programmable processor; and
a non-transitory machine-readable medium storing instructions that, when executed by the at least one programmable processor, cause the at least one programmable processor to perform operations comprising:
receiving a query for execution by a software application;
generating a just-in-time executable code for execution of the received query;
determining to include one or more testing codes in the generated just-in-time executable code as a result of a previous execution of a previously received query by the software application, the one or more testing codes being associated with one or more conditions, and the one or more testing codes used for testing the software application;
performing, using the at least one processor, an assessment of the one or more conditions that are associated with the one or more testing codes to determine whether to activate the one or more testing codes;
activating, using the at least one processor, the one or more testing codes upon a determination that there are one or more errors associated with the previous execution of the previously received query by the software application; and
executing the generated just-in-time executable code and the one or more testing codes, wherein the one or more testing codes are executed upon a determination that the one or more testing codes are activated.

10. The system according to claim 9, wherein the instructions cause the at least one programmable processor to perform further operations comprising providing a configuration switching mechanism to allow activation of the one or more testing codes in a released version of the software application.

11. The system according to claim 10, wherein the one or more conditions include at least one of the following: a logical condition, a Boolean expression condition, a condition determining whether to activate one or more testing codes, and any combination thereof.

12. The system according to claim 11, wherein the one or more conditions are assessed during at least one previous execution of another received query by the software application.

13. The system according to claim 12, wherein the one or more testing codes are activated based on an exception during the at least one previous execution of another received query by the software application.

14. The system according to claim 9, wherein the generating includes compiling the just-in-time executable code for execution of the received query.

15. The system according to claim 14, wherein the determining includes determining that the generated just-in-time executable code includes one or more testing codes based on the compiling of the just-in-time executable code.

16. The system according to claim 9, wherein the executing includes executing the generated just-in-time executable code and the one or more testing codes, wherein the one or more testing codes are selectively activated for the executing.

17. A computer program product comprising a non-transitory machine-readable medium storing instructions that, when executed by at least one programmable processor, cause operations comprising:
receiving a query for execution by a software application;
generating a just-in-time executable code for execution of the received query;
determining to include one or more testing codes in the generated just-in-time executable code as a result of a previous execution of a previously received query by the software application, the one or more testing codes being associated with one or more conditions, and the one or more testing codes used for testing the software application;

performing, using the at least one processor, an assessment of the one or more conditions that are associated with the one or more testing codes to determine whether to activate the one or more testing codes;

activating, using the at least one processor, the one or more testing codes upon a determination that there are one or more errors associated with the previous execution of the previously received query by the software application; and executing the generated just-in-time executable code and the one or more testing codes, wherein the one or more testing codes are executed upon a determination that the one or more testing codes are activated.

18. The computer program product according to claim 17, wherein the instructions cause the at least one programmable processor to perform further operations comprising providing a configuration switching mechanism to allow activation of the one or more testing codes in a released version of the software application.

19. The computer program product according to claim 18, wherein the one or more conditions include at least one of the following: a logical condition, a Boolean expression condition, a condition determining whether to activate one or more testing codes, and any combination thereof.

20. The computer program product according to claim 19, wherein the one or more conditions are assessed during at least one previous execution of another received query by the software application.

* * * * *